United States Patent
Muramatsu et al.

(10) Patent No.: US 9,378,425 B2
(45) Date of Patent: Jun. 28, 2016

(54) ON-VEHICLE IMAGE PROCESSING DEVICE

(71) Applicants: CLARION CO., LTD., Saitama-shi, Saitama (JP); NISSAN MOTOR CO., LTD., Yokohama-shi, Kanagawa (JP)

(72) Inventors: Shoji Muramatsu, Hitachi (JP); Takehito Ogata, Hitachi (JP); Masahiro Kiyohara, Tokyo (JP); Satoshi Suzuki, Saitama (JP); Osamu Fukata, Commerce Township, MI (US); Yasuhisa Hayakawa, Yokohama (JP); Akira Morimoto, Machida (JP)

(73) Assignees: CLARION CO., LTD., Saitama-shi (JP); NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/647,219

(22) PCT Filed: Nov. 21, 2013

(86) PCT No.: PCT/JP2013/081403
§ 371 (c)(1),
(2) Date: May 26, 2015

(87) PCT Pub. No.: WO2014/084118
PCT Pub. Date: Jun. 5, 2014

(65) Prior Publication Data
US 2015/0317526 A1 Nov. 5, 2015

(30) Foreign Application Priority Data
Nov. 27, 2012 (JP) .................... 2012-258697

(51) Int. Cl.
*H04N 9/47* (2006.01)
*G06K 9/00* (2006.01)
(Continued)

(52) U.S. Cl.
CPC ........ *G06K 9/00812* (2013.01); *G06K 9/00798* (2013.01); *G06T 1/00* (2013.01);
(Continued)

(58) Field of Classification Search
CPC .................... G06K 9/46; G06K 2009/4666
USPC .......................................... 348/148
See application file for complete search history.

(56) References Cited

U.S. PATENT DOCUMENTS

2003/0156045 A1* 8/2003 Tanaka .................. B60Q 9/004
340/932.2
2004/0257244 A1* 12/2004 Kubota .............. B62D 15/0285
340/932.2

(Continued)

FOREIGN PATENT DOCUMENTS

JP 6-56619 B2 7/1994
JP 2002-170103 A 6/2002

(Continued)

OTHER PUBLICATIONS

Ho Gi Jung et al., Stereo Vision Based Localization of Free Parking Site, Computer Analysis of Images and Patterns: 11th International Conference, CAIP 2005, pp. 231-239.

*Primary Examiner* — Leron Beck
(74) *Attorney, Agent, or Firm* — Foley & Lardner LLP

(57) ABSTRACT

A parking frame drawn on a road surface is reliably detected. An imager (10) installed on a vehicle (1) captures an image (I) including at least a road surface around the vehicle (1). A candidate white-line area detector (30) detects, from the captured image (I), a candidate white-line area which is possibly a part of a parking frame. A parking-frame-similitude calculator (40) calculates the brightness distribution of the detected candidate white-line area and the surroundings of boundary points of a road surface. When the brightness distribution satisfies a certain condition, the parking-frame similitude or the degree to which the candidate white-line area forms a parking frame, is determined to be low. When a parking-frame similitude of the candidate white-line area forming a parking frame is detected in the image (I) by a parking-frame detector (60), the credibility (U) for the detected parking frame is set low.

5 Claims, 14 Drawing Sheets

(51) Int. Cl.
*H04N 7/18* (2006.01)
*G06T 7/00* (2006.01)
*G06T 1/00* (2006.01)

(52) U.S. Cl.
CPC ............... *G06T 7/004* (2013.01); *H04N 7/181* (2013.01); *G06T 2207/10016* (2013.01); *G06T 2207/30232* (2013.01); *G06T 2207/30256* (2013.01); *G06T 2207/30261* (2013.01); *G06T 2207/30264* (2013.01)

(56) References Cited

U.S. PATENT DOCUMENTS

| | | | | |
|---|---|---|---|---|
| 2004/0260439 | A1* | 12/2004 | Endo | B60Q 1/48 701/36 |
| 2009/0207045 | A1 | 8/2009 | Jung | |
| 2010/0033348 | A1* | 2/2010 | Kawabata | B60R 1/00 340/932.2 |
| 2010/0235053 | A1* | 9/2010 | Iwakiri | B62D 15/027 701/42 |
| 2010/0245574 | A1* | 9/2010 | Imanishi | B60R 1/00 348/148 |
| 2010/0274474 | A1* | 10/2010 | Takano | B62D 15/028 701/532 |
| 2010/0283632 | A1* | 11/2010 | Kawabata | G08G 1/166 340/932.2 |
| 2011/0074957 | A1* | 3/2011 | Kiyohara | G06K 9/342 348/148 |
| 2011/0216194 | A1* | 9/2011 | Kosaki | H04N 7/18 348/148 |
| 2012/0161983 | A1* | 6/2012 | Yao | B62D 15/0285 340/932.2 |
| 2014/0354452 | A1* | 12/2014 | Okuyama | B62D 15/028 340/932.2 |

FOREIGN PATENT DOCUMENTS

| | | |
|---|---|---|
| JP | 2011-126433 A | 8/2010 |
| JP | 2011-126433 A | 6/2011 |
| JP | 2011-154480 A | 8/2011 |

\* cited by examiner

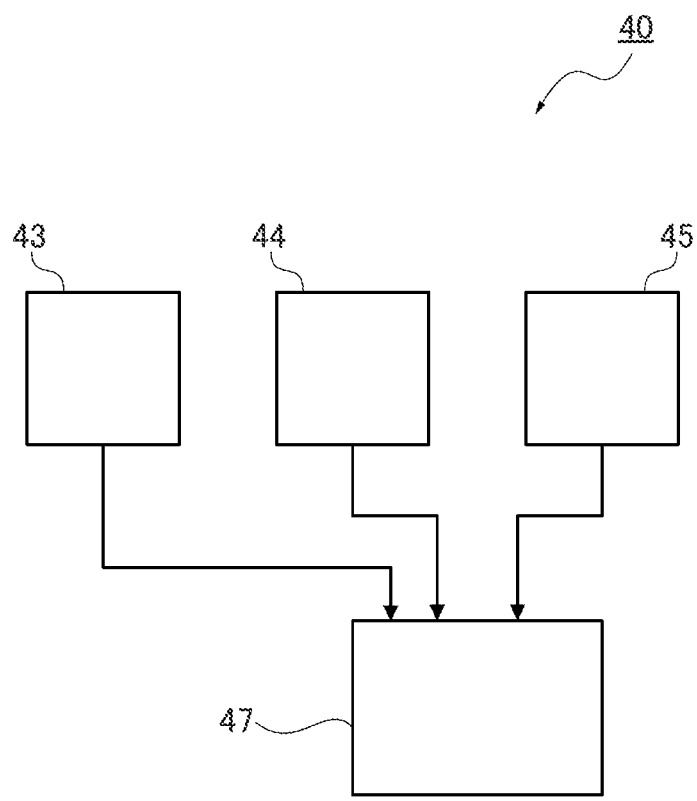

FIG.7

| CANDIDATE WHITE-LINE AREA | ONE END POSITION OF CENTRAL LINE | THE OTHER END POSITION OF CENTRAL LINE | SYMMETRY FLAG | BRIGHTNESS-DIFFERENCE FLAG | HORIZONTAL DIFFERENCE FLAG |
|---|---|---|---|---|---|
| 1 | $(x_{10}, y_{10})$ | $(x_{11}, y_{11})$ | 0 | 0 | 0 |
| 2 | $(x_{20}, y_{20})$ | $(x_{21}, y_{21})$ | 0 | 1 | 0 |
| 3 | $(x_{30}, y_{30})$ | $(x_{31}, y_{31})$ | 1 | 1 | 1 |
| n | $(x_{n0}, y_{n0})$ | $(x_{n1}, y_{n1})$ | 1 | 0 | 1 |

$$E(P_{R1}) = \frac{T_1' + T_2' + T_4'}{Q_1'}$$

FIG.9

○ : EFFECTIVE
△ : PARTIALLY EFFECTIVE
— : IRRELEVANT

| CAUSE OF ERROR IN PARKING-FRAME DETECTION | EXAMPLES OF CAUSE | EFFECTS OF PRESENT INVENTION ||||
|---|---|---|---|---|---|
| | | SYMMETRY FLAG | BRIGHTNESS-DIFFERENCE FLAG | HORIZONTAL DIFFERENCE | USE OF SONOR |
| VERTICAL SOLID OBJECT | POLE | — | — | — | ○ |
| | OTHER VEHICLE'S WHEEL | ○ | ○ | △ | ○ |
| | SHRUBBERY | ○ | ○ | △ | △ |
| NONE-VERTICAL SOLID OBJECT | VEHICLE BODY DESIGN | ○ | ○ | △ | ○ |
| | WALL SURFACE | ○ | ○ | △ | ○ |
| ROAD SURFACE CONDITION | CURB/ UNEVENESS | ○ | △ | ○ | — |
| | RAINWATER DRAINAGE | ○ | △ | ○ | — |
| ADVERSE WEATHER | ROAD SURFACE REFLECTION | — | — | △ | — |
| | ATTACHED RAINDROPS | — | ○ | △ | — |
| SHADOW | SHADOW OF VEHICLE | ○ | ○ | — | △ |
| | ELECTRIC WIRE | ○ | ○ | — | — |

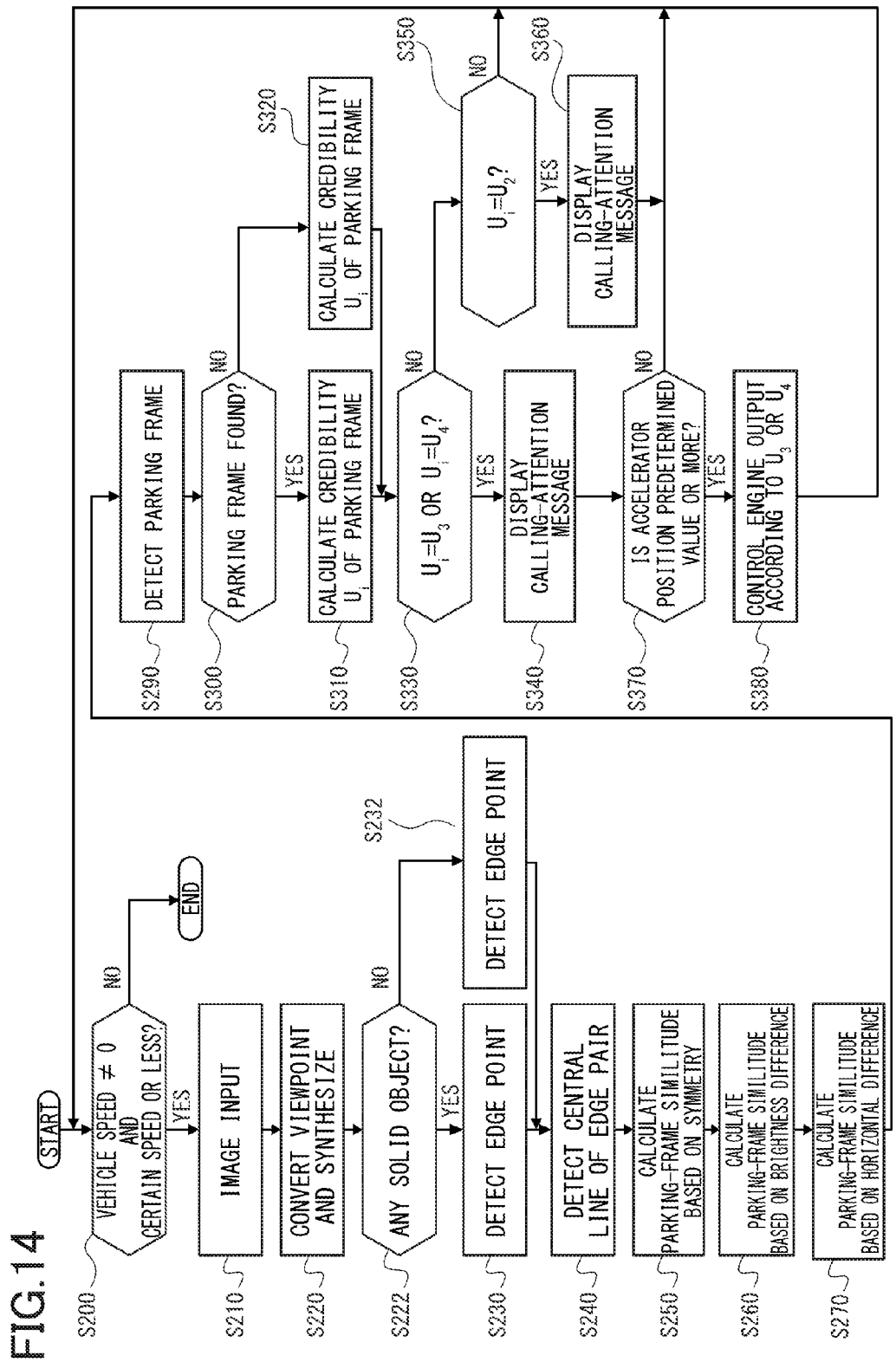

ON-VEHICLE IMAGE PROCESSING DEVICE

TECHNICAL FIELD

The present invention relates to an on-vehicle image processor which detects the position of a parking frame drawn on a road surface with an on-vehicle camera.

BACKGROUND ART

In recent years a parking assist device has been studied and developed. For assisting parking operation, this device uses a camera mounted on a vehicle to observe the surroundings of the vehicle, detects the position of a parking frame marked by white or yellow lines drawn on a road surface from an observed image, and calculates a relationship between the position of the vehicle and the line markings according to the detected position of the parking frame.

Such a system makes use of the feature of the parking frame having brightness largely different from that of the road surface, for example, to detect the position of a parking frame by detecting pixels having brightness largely different from that of the road surface and applying straight lines to the columns of detected pixels (Patent Literature 1, for instance).

CITATION LIST

Patent Literature

Patent Literature 1: Japanese Laid-Open Patent Application Publication No. 2011-126433

SUMMARY

Technical Problem

The parking assist device in Patent Literature 1 detects white lines defining a parking frame using Hough transform for detecting components of straight lines from an image.

However, the invention disclosed in Patent Literature 1 detects white line markings on the assumption that the white lines on the road surface exert high contrast. Meanwhile, various kinds of noise occur on actual road surfaces, including a solid object, a wall surface or a shrubbery near a parking frame, a curb or step on a road surface or optical reflection by a road surface, or a shadow on a road surface. Such noise causes erroneous detection of an area with brightness distribution similar to that of white lines of a parking frame or decreases the contrast of the white lines as a primary target. Accordingly, there is a problem that it is difficult to accurately detect only the white lines defining a parking frame.

The present invention aims to provide an on-vehicle image processor which can stably detect the position of a parking frame drawn on a road surface irrespective of noise such as a solid object, a road condition, weather, and shadow.

Solution to Problem

The on-vehicle image processor according to the present invention comprises an imager mounted on a vehicle, which observes surroundings of the vehicle and captures an image including at least a road surface, a candidate white-line area detector which detects positions of a first pixel and a second pixel while scanning the image captured by the imager in a certain direction, the first pixel of which a brightness value changes to be brighter and exceeds a predetermined value, the second pixel being located within a certain distance from the first pixel, of which a brightness value changes to be darker and exceeds a predetermined value, and detects, as a candidate white-line area forming a parking frame, an area surrounded by both end points of a linear element of the first pixels and both end points of a linear element of the second pixels, a parking-frame similitude calculator which calculates a parking-frame similitude according to a brightness distribution of surroundings of the first pixels of the candidate white-line area and a brightness distribution of surroundings of the second pixels, the parking-frame similitude being a similitude when individual candidate white-line areas are assumed to form a parking frame, and a parking frame detector which detects a parking frame according to the position of the candidate white-line area, the parking-frame similitude, and an expected size of a parking frame observed in the image, in which the parking-frame similitude calculator decreases the parking-frame similitude of the candidate white-line area when the brightness distributions of the surroundings of the first pixels and the second pixels of the candidate white-line area satisfy a certain condition.

In the on-vehicle image processor according to the present invention as configured above, the imager mounted on the vehicle captures the image including at least a road surface around the vehicle. The candidate white-line area detector detects, from the captured image, a candidate white-line area which is possibly a part of a parking frame. The parking-frame similitude calculator calculates a brightness distribution around a boundary point between the road surface and the detected candidate white-line area and determines a parking-frame similitude to be low when the brightness distribution satisfies a certain condition, the similitude being a degree in which the candidate white-line area forms a parking frame. The parking frame detector detects a parking frame on the basis of an expected size of a parking frame in the image. Then, when a parking-frame similitude of the candidate white-line area is low, the credibility of the detected parking frame is set low. Thereby, it is able to prevent an erroneous detection of a parking frame because of noise on the road surface and stably detect the position of a parking frame drawn on the road surface.

Advantageous Effects

The on-vehicle image processor according to the present invention can stably detect the position of a parking frame on a road surface.

BRIEF DESCRIPTION OF DRAWINGS

FIG. 3 is a block diagram of a detailed structure of a parking-frame similitude calculator of the first example according to one embodiment of the present invention.

FIG. 7 shows how to store information representing the parking-frame similitude.

FIG. 9 shows scenes for which application of the present invention can bring effects.

FIG. 14 is a flowchart for the processing of the second example according to one embodiment of the present invention.

DESCRIPTION OF EMBODIMENTS

Hereinafter, an on-vehicle image processor according to one embodiment of the present invention is described with reference to the accompanying drawings. Note that hereinafter, a value of shading of an image is referred to as brightness value.

First Example

A first example of one embodiment of the present invention is an example where the on-vehicle image processor is applied to a sudden acceleration preventing system. Such a system is intended for avoiding a driver from erroneously stepping on an acceleration pedal instead of a brake pedal and operating a vehicle to abruptly start moving at unexpected timing while the driver is parking the vehicle in a parking space of which a parking frame is drawn on the road surface.

Figure 1:
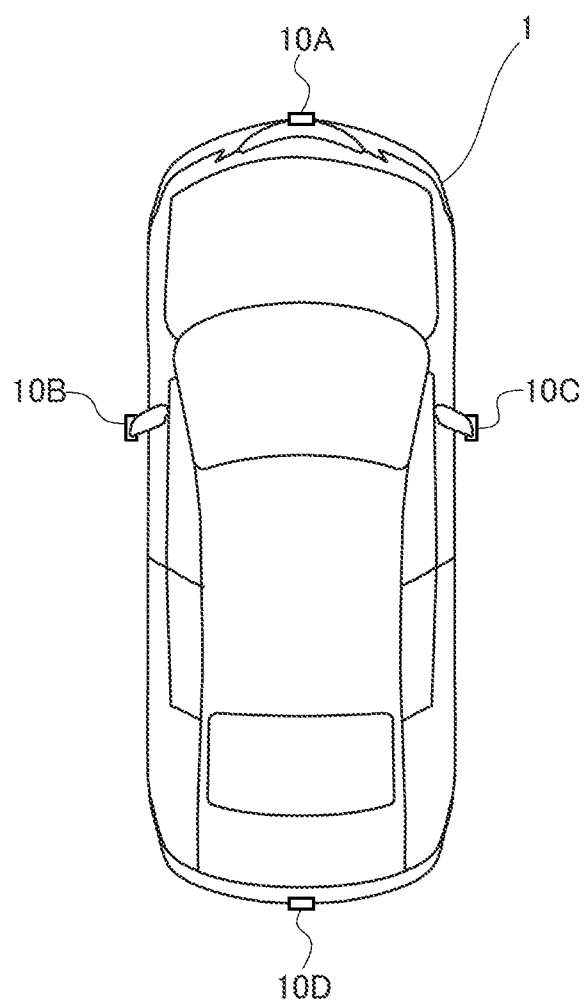
FIG. 1 shows a vehicle on which a first example of an on-vehicle image processor according to one embodiment of the present invention is mounted.
Figure 2:
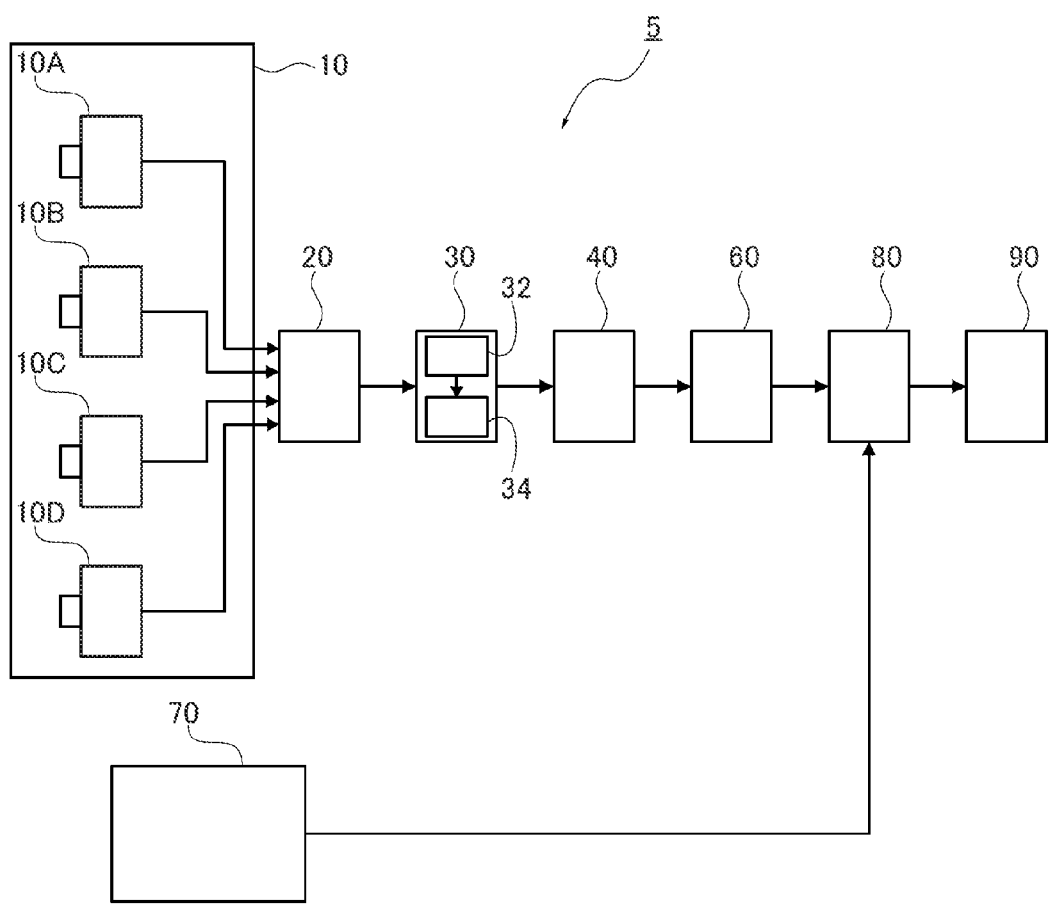
FIG. 2 is a block diagram of the overall structure of the first example of one embodiment of the present invention.

First, the structure of the first example is described referring to FIG. 1 to FIG. 3. The on-vehicle image processor of the first example is mounted on a vehicle 1 and includes a front camera 10A for imaging a front side of the vehicle, a left camera 10B attached to a left door mirror of the vehicle 1 to image a left side of the vehicle 1, a right camera 10C attached to a right door mirror of the vehicle 1 to image a right side of the vehicle, and a rear camera 10D for imaging a rear side of the vehicle 1, as shown in FIG. 1. An imager 10 including the four cameras can monitor the road surface around the vehicle 1. Each of the cameras includes an optical system including lenses having light condensing function and a photoelectric converting element such as CMOS.

FIG. 2 is a block diagram of the overall structure of an on-vehicle image processor 5. The on-vehicle image processor 5 includes the imager 10 mounted on the vehicle 1 (FIG. 1) for imaging a surrounding area of the vehicle 1 including a road surface, an image converter and synthesizer 20 for converting an image captured by the front, left, right, and rear cameras 10A, 10B, 10C, 10D to overhead images of the vehicle 1 viewed from directly above to synthesize them into a single image, a candidate white-line area detector 30 for detecting a candidate for a white line area estimated as a part of a parking frame in the image synthesized by the image converter and synthesizer 20, a parking-frame similitude calculator 40 for calculating a parking-frame similitude in each of areas detected by the candidate white-line area detector 30, a parking-frame detector 60 for detecting a parking frame in the image on the basis of the parking-frame similitude calculated by the parking-frame similitude calculator 40, an accelerator position detector 70 for detecting an accelerator position of the vehicle 1, a vehicle behavior controller 80 for controlling the vehicle 1 to reduce an engine output and prevent a sudden acceleration of the vehicle 1 when the parking-frame detector 60 detects the parking frame and a certain value or more of the accelerator position is detected, and an information output 90 including a display device and an audio output to notify a driver of the vehicle 1 of the situation that a parking frame is being detected or the engine output is being reduced.

The candidate white-line area detector 30 includes an edge pair detector 32 which detects a pair of +edge and −edge adjacent to each other in a certain direction (later described) and a central-line detector 34 which detects a central line formed by midpoints of lines connecting edge pairs from each candidate white-line area.

As shown in FIG. 3, the parking-frame similitude calculator 40 further includes a symmetry evaluator 43 which evaluates symmetry between brightness distributions of a candidate white-line area and its peripheral area, a brightness difference evaluator 44 which evaluates a magnitude of brightness difference between pixels of the candidate white-line area and pixels of a non-candidate white-line area, a horizontal difference evaluator 45 which evaluates a brightness difference between pixels of the central line of the candidate white-line area and pixels of a non-candidate white-line area located horizontally symmetric relative to the central line, and a parking-frame similitude manager 47 which stores and manages evaluation values calculated by the symmetry evaluator 43, brightness difference evaluator 44, and horizontal difference evaluator 45.

In the following the operation of the first example is described.

Method for Detecting Candidate White-Line Area

Figure 4A:
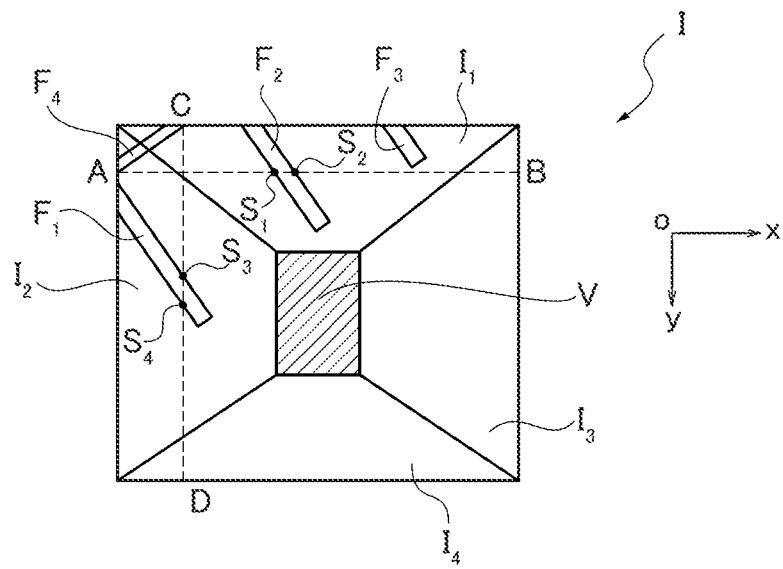
FIG. 4A shows an example of image synthesized and captured in the first example.
Figure 4B:
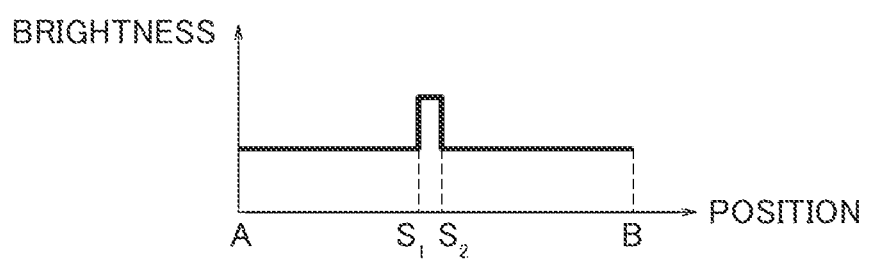
FIG. 4B is a graph showing a brightness distribution between points A and B in the image in FIG. 4A.
Figure 4C:
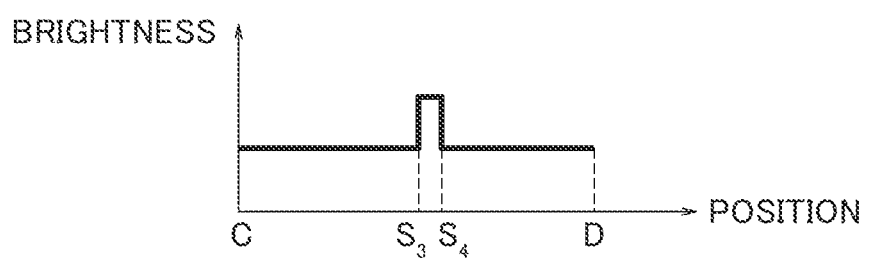
FIG. 4C is a graph showing a brightness distribution between points C and D in the image in FIG. 4A.

Referring to FIG. 4A to FIG. 4C, a description is made on how the candidate white-line area detector 30 detects a candidate white-line area.

FIG. 4A shows a synthesized image I. Images $I_1$, $I_2$, $I_3$, $I_4$ are captured by the front camera 10A, left camera 10B, right camera 10C, and rear camera 10D respectively, when the vehicle 1 is moving forward to a parking frame formed of white lines $F_1$ to $F_4$. Then, the images are converted into overhead images of the vehicle 1 viewed from directly above and synthesized into the image I by the image converter and synthesizer 20.

The image I is generated by synthesizing the overhead images $I_1$, $I_2$, $I_3$, $I_4$ around a region V corresponding to the position of the vehicle 1, as shown in FIG. 4A. Since the image I is of the vehicle 1 or a road surface viewed from directly above, white straight lines $F_1$, $F_2$, $F_3$, drawn on the right and left side of the vehicle and extending in a vehicle front-back direction, appear to be parallel to each other in the image I. Further, another white straight line $F_4$ appears to be orthogonal to the white lines $F_1$, $F_2$, $F_3$.

The processing in which the image captured by the imager 10 is converted into overhead images and synthesized into a single image is in practical use and known as a vehicle surrounding monitoring system. Therefore, a detailed description of the processing is omitted.

The horizontal direction of the generated image I is defined to be x and the vertical direction is defined to be y, and the upper left of the vehicle is defined to be original point (0, 0). In the following a brightness value of a pixel (x, y) of the image I will be expressed by I (x, y) and a brightness value of a specific pixel X will be expressed by I (X).

The candidate white-line area detector 30 (FIG. 2) scans the image I horizontally from left to right (certain direction) and calculates a difference in brightness values I (x, y) of two neighboring pixels. That is, for every scanned pixel (x, y) of the image I, a brightness difference I (x−1, y)−I(x, y) and a brightness difference I (x, y)−I (x+1, y) are calculated in series.

Then, the candidate white-line area detector 30 detects as a first pixel a pixel varying brightly from left to right and having a larger brightness value than a predetermined value, that is, a value satisfying I(x, y)−I(x−1, y)>$I_{th}$ relative to a predetermined brightness difference threshold $I_{th}$. The first pixel is referred to as +edge.

Moreover, the candidate white-line area detector 30 detects as a second pixel a pixel varying dark from left to right with a larger brightness value than a predetermined value, that is, a value satisfying I(x, y)−I(x−1, y)<$I_{th}$. The second pixel is referred to as −edge.

If the pixels are of a white line of a parking frame, the pixels as +edges (boundary point between white line and road surface) and the pixels as −edges (boundary point between white line and road surface) are both detected lineally and the interval between these pixels is approximately equal to the width of the white lines forming the parking frame. In view of this, when an interval w between a +edge pixel and a −edge pixel is within a predetermined distance in a certain direction (from left to right in the image), an area placed between the +edge pixel and −edge pixel is determined to be a likely white line of a parking frame. Thus, these pixels are detected.

For example, when the image is scanned from the point A to the point B in FIG. 4A to obtain brightness values, a pixel $S_1$ is detected as +edge and a pixel $S_2$ is detected as −edge as shown in FIG. 4B.

The detected +edge pixel $S_1$ and −edge pixel $S_2$ are referred to as an edge pair.

It is also preferable to search for pixels with a large brightness difference in a vertical direction (orthogonal to the certain direction) of the image I. When the image I is scanned from the point C to the point D in FIG. 4A to obtain brightness values, a pixel $S_3$ is detected as +edge and a pixel $S_4$ is detected as −edge in FIG. 4C. The pixel $S_3$ and the pixel $S_4$ are an edge pair.

The detected pixels $S_1$, $S_2$, $S_3$, $S_4$, . . . are determined to be edge points as a likely white line of a parking frame.

The brightness values of pixels of the image I are scanned twice in the horizontal and vertical directions (certain direction and direction orthogonal to certain direction) because in which direction the white lines of a parking frame extend is unknown. Thus, candidate white lines extending in any direction can be detected without omission.

The area placed in-between the detected edge pair, that is, the end points of a linear element including the first pixel and the end points of a linear element including the second pixel are referred to as candidate white-line areas. Candidate white-line areas detected in the image I are subjected to labeling and added with serial numbers.

Calculation of Parking-Frame Similitude

Next, a parking-frame similitude of each of the detected candidate white-line areas is calculated on the basis of a brightness distribution of each candidate white-line area and that of a neighboring area of each candidate white-line area. The parking-frame similitude is a similitude when individual candidate white-line areas are assumed to form a parking frame.

In this example the parking-frame similitude is determined according to three evaluation indexes, symmetry, brightness difference, and horizontal difference. Each of the evaluation indexes will be described below.

Symmetry as Evaluation Index

First, one of the evaluation indexes, symmetry is described. The white lines of a parking frame are different in brightness from a road surface and symmetric areas relative to the central line on both sides of the white lines should show approximately equal brightness distribution. By making use of this, symmetry of the brightness distribution is evaluated.

When the symmetry is found to be lower than a predetermined value, the candidate white-line area in question is probably not a white line of a parking frame so that a symmetry flag is set for this candidate white-line area. The symmetry flag set for the candidate white-line area is used in detecting a parking frame later.

Figure 5A:
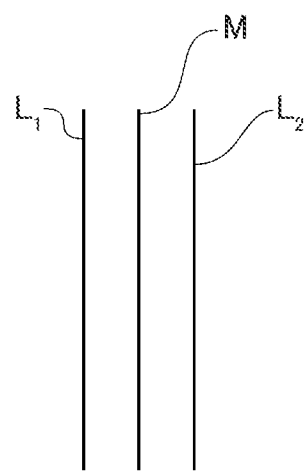
FIG. 5A shows one example of a candidate for a white line defining a parking frame detected in the first example according to one embodiment of the present invention.
Figure 5B:
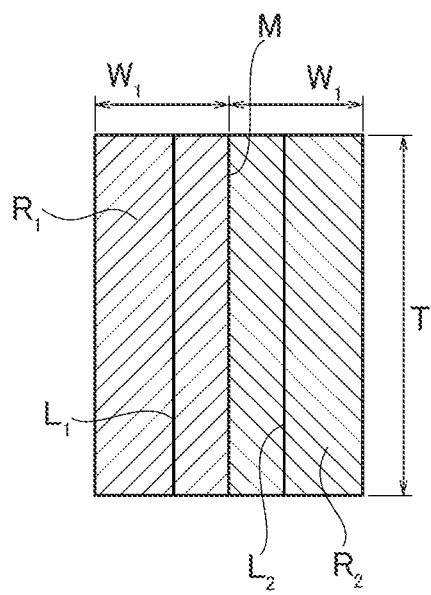
FIG. 5B shows an example of setting an area in which a brightness distribution is calculated on the candidate for a white line in FIG. 5A.
Figure 5C:
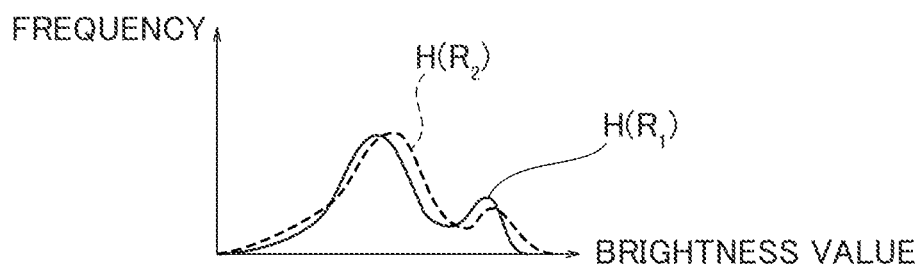
FIG. 5C is a graph showing an example of brightness distribution inside the area set in FIG. 5B.

Referring to FIG. 5A to FIG. 5C, how to evaluate the symmetry is described specifically. First, the edge pair detector 32 (FIG. 2) searches the image I from left to right to extract an edge pair in each candidate white-line area. Candidate white-line area boundaries $L_1$ and $L_2$ formed by +edges and −edges, respectively are specified as shown in FIG. 5A.

Then, the central-line detector 34 (FIG. 2) detects a central line M of the candidate white-line area boundaries $L_1$ and $L_2$. The central line M can be detected as a line connecting the midpoints of the +edges and −edges.

Next, referring to FIG. 5B, areas in width $W_1$ (second certain distance) are set on the +edge and −edge sides of the central line M. The width $W_1$ is defined to be a value obtained by adding a predetermined value to a half value of the width of the white lines of the parking frame. The area on the +edge side is area $R_1$ and the area on the −edge side is area $R_2$. When the length of the candidate white-line area or the central line is T, the areas $R_1$ and $R_2$ each include $W_1 T$ pixels.

Referring to FIG. 5C, brightness histograms $H(R_1)$ and $H(R_2)$ of the areas $R_1$ and $R_2$ are created. The cross-correlation of the two brightness histograms $H(R_1)$ and $H(R_2)$ are calculated for quantifying their similitude. If the cross-correlation is lower than a predetermined value, the similitude of the brightness histograms $H(R_1)$ and $H(R_2)$ is determined to be low. Alternatively, the similitude between the two histograms can be evaluated by Bhattacharyya distance in addition to the cross-correlation, for example.

With a low similitude obtained, a symmetry flag is set for the evaluated candidate white-line area. All the candidate white-line areas are subjected to the same evaluation.

Brightness Difference as Evaluation Index

Next, the brightness difference as the evaluation index is described. The brightness of the white lines of the parking frame is greatly different from that of the road surface. This is the reason for the brightness difference is evaluated.

When a brightness difference is smaller than a predetermined value, the candidate white-line area in question is probably not a part of the parking frame so that a brightness difference flag is set for this candidate white-line area. The brightness difference flag set for the candidate white-line area is used in detecting a parking frame later.

Figure 6A:
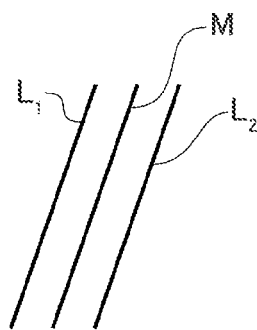
FIG. 6A shows one example of candidate white lines which likely form a parking frame detected in the first example according to one embodiment of the present invention.
Figure 6B:
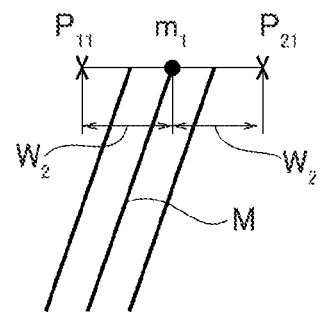
FIG. 6B shows one example of a pixel position set on the candidate white line for calculating a difference in brightness between the right and left sides of the candidate white lines.

Now, the evaluation of the brightness difference when the candidate white-line area boundaries $L_1$, $L_2$ in FIG. 6A are detected is specifically described. Referring to FIG. 6B, pixels are set to be apart from a pixel $m_1$ on the central line M detected in the symmetry evaluation to the +edge and −edge sides by a distance $W_2$ (first certain distance). The distance is defined to be a value obtained by adding a predetermined value to the width of the white lines of the parking frame. The pixel (third pixel) set on the +edge side is $P_{11}$ and the pixel (fourth pixel) set on the −edge side is $P_{21}$.

Figure 6C:
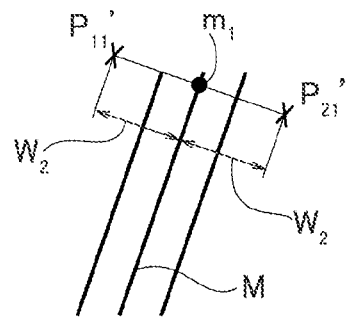
FIG. 6C shows an example where the pixel position set in FIG. 6B is converted to be orthogonal to the candidate white line.

The direction in which the candidate white-line area extends is not limited to a vertical or horizontal direction in the image. It extends in an arbitrary direction as shown in FIG. 6A. In view of this, the pixels $P_{11}$ and $P_{12}$ set above are converted to pixels $P_{11}'$ and $P_{21}'$ in a direction orthogonal to the central line M as shown in FIG. 6C.

Next, the brightness values I $(m_1)$, $I(P_{11}')$, $I(P_{21}')$ of the pixels m1, $P1_{11}'$, $P_{21}'$ are obtained to find a smaller one of a brightness difference I $(m_1)$−I $(P_{11}')$ and a brightness difference $I(m_1)$−$I(P_{21}')$.

Then, when the smaller brightness difference is smaller than a predetermined value, a voting value representing a brightness difference between the concerning candidate white-line area and the road surface is incremented.

Figure 6D:
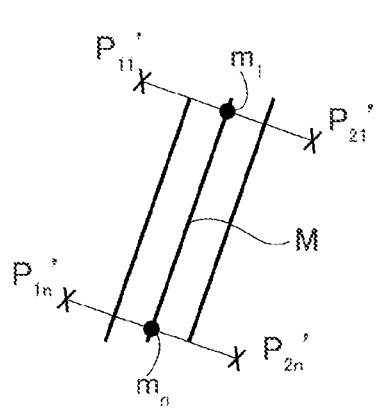
FIG. 6D shows calculating a difference in brightness between the right and left sides of the candidate white lines while shifting the pixels set on the candidate white line in FIG. 6C.

The brightness difference is evaluated in the same manner while the pixel $m_1$ is moved to the position of a pixel $m_n$ at the other end of the central line M, referring to FIG. 6D.

Upon completion of the evaluation of one candidate white-line area, the voting value is normalized by the length of the candidate white-line area, that is, length T (FIG. 5B) of the central line. When a normalized value is larger than a predetermined value, that is, a certain ratio or more of pixels of the central line are smaller in the brightness difference between the candidate white-line area and a neighboring road surface area than a predetermined value, a brightness difference flag is set for the candidate white-line area in question. All the candidate white-line areas are subjected to the same evaluation.

Horizontal Difference as Evaluation Index

Lastly, the horizontal difference of the evaluation indexes is described. The white lines of a parking frame are different in brightness from a road surface. The brightness differences between the right and left sides of a white line are approximately equal. Because of this, the horizontal brightness difference is evaluated.

When a horizontal brightness difference is larger than a predetermined value, the candidate white-line area in question is probably not a part of parking frame, and a horizontal difference flag is set for the candidate white-line area. The horizontal difference flag set for the candidate white-line area is used in detecting a parking frame later.

Next, the evaluation of a horizontal difference is described specifically, referring to FIG. 6A to FIG. 6D. The brightness value $I(P_{11}')$ of the pixel $P_{11}'$ on the +edge side and that $I(P_{21}')$ of the pixel $P_{21}'$ on the −edge side apart by the width $W_2$ from the pixel $m_1$ on the central line M are obtained to find a brightness difference $I(P_{11}')$−$I(P_{21}')$.

When the found brightness difference is larger than a predetermined value, a voting value for evaluating a horizontal brightness difference is incremented for the candidate white-line area in question.

As shown in FIG. 6D, a horizontal brightness difference is evaluated in the same manner while the pixel $m_1$ is moved to the position of the pixel $m_n$ at the other end of the central line M.

Upon completion of the evaluation of one candidate white-line area, the voting value is normalized by the length of the candidate white-line area, that is, length T of the central line. When a normalized value is larger than a predetermined value, that is, brightness difference between the +edge and −edge sides of the candidate white-line area is larger than a predetermined value, a horizontal difference flag is set for the candidate white-line area in question. All the candidate white-line areas are subjected to the same evaluation.

Thus, the symmetry flag, brightness difference flag, and horizontal difference flag added to the candidate white-line areas are stored in a parking-frame similitude manager 47 and used for detecting a parking frame, as described later. FIG. 7 shows storing and managing of the symmetry flag, brightness difference flag, and horizontal difference flag.

In FIG. 7 the positions (of the pixels $m_1$, $m_n$ on both ends of the central line M, for example) of each of all the candidate white-line areas detected in the image I and the addition or non-addition of the symmetry flag, brightness difference flag, and horizontal difference flag are stored. The succeeding processing is performed with reference to this list. A number of flags can be added to one candidate white-line area, as shown in FIG. 7.

How to Detect Parking Frame

Next, how a parking frame is detected is described. Various detecting methods are available and any of them can be applied. Herein, detecting a parking frame according to the features of frame shape is described.

The features of the shape of a parking frame are exemplified in the following (1) to (3).

(1) The parking frame is an area placed between two parallel white lines having a certain length with a certain interval.

(2) One of the two parallel white lines may be shared by two neighboring parking frames as shown in FIG. 4A or two white lines may be drawn between adjacent parking frames.

(3) The end points of the parallel white lines may be connected by a white line, only the back side of the parking frame may be connected as shown in FIG. 4A, or the end points of the parallel white lines may not be connected.

According to the first example, the size of a parking frame observed in the image I is stored first. The size of a parking frame refers to the length (can be the length of the central line M) of the two parallel white lines extending in the vehicle front-back direction when a vehicle is parked in the parking frame, and the interval between the two lines.

Since the image I is an overhead view of the vehicle 1 as seen from directly above, the area observed in the image I can be easily estimated by use of a parameter for converting captured images into an overhead view. Accordingly, it is possible to estimate how large an assumed size of a parking frame is observed in the image I. Herein, the length of the two parallel white lines extending in the vehicle front-back direction is estimated to be a first predetermined number of pixels $O_1$ and the interval between the two lines is estimated to be a second predetermined number of pixels $O_2$.

Then, pairs of candidate white-line areas extending in almost the same direction are detected from the candidate white-line areas detected in the image I. The direction of the candidate white-line area can be considered as the direction (of the line connecting the two end points, pixels $m_1$, $m_n$) of the detected central line M. The information on the detected candidate white-line areas is stored in list form as shown in FIG. 7. The detection of the parallel candidate white-line areas is performed on the basis of the information in the list.

It is determined that a pair of the parallel candidate white-line areas of a parking frame is found, when the interval therebetween is close to the second predetermined number of pixels $O_2$. Next, the length of the candidate white-line areas is calculated as the length of the central line M. When the calculated length of the central line M is close to the assumed length of the parking frame, that is, the first predetermined number of pixels $O_1$, the candidate white-line area is determined to be a part of the parking frame.

Usage of Parking-Frame Similitude

After detecting the parking frame, credibility U of the detected parking frame is calculated using the symmetry flag, brightness difference flag, and horizontal difference flag added or not added to each candidate white-line area in FIG. 7

Specifically, when any of the symmetry flag, brightness difference flag, and horizontal difference flag is added to the candidate white-line area, the credibility of the candidate white-line area is considered to be low even if the area forms a parking frame. Further, the credibility of a candidate white-line area with two or more flags is considered to be lower than the one with one flag. Thereby, a possibility that the candidate white-line area is noise can be reflected in the credibility.

Specifically, the credibility is calculated in the following manner. First, after detection of a parking frame, whether or not the flags are added to candidate white-line areas in the parking frame is checked. In accordance with added flag or flags, the length $M_L$ of the central line of the candidate white-line area is shortened at a certain ratio to a length $M_L'$.

For instance, the length $M_L$ of the central line M can be corrected to become shorter by 10% for every flag added. After the central lines M of all the candidate white-line areas are corrected in accordance with the flags added, a ratio E is obtained. The ratio E is of a total sum of the corrected lengths $M_L'$ of the central lines of all the candidate white-line areas to the lengths of the portions of a perimeter of the parking frame displayed in the image I. The credibility U is provided to the parking frame on the basis of a calculated ratio E such that the larger the ratio E, the higher the credibility. Examples of the calculation of the credibility U are shown in FIG. 8A to FIG. 8C.

Figure 8A:
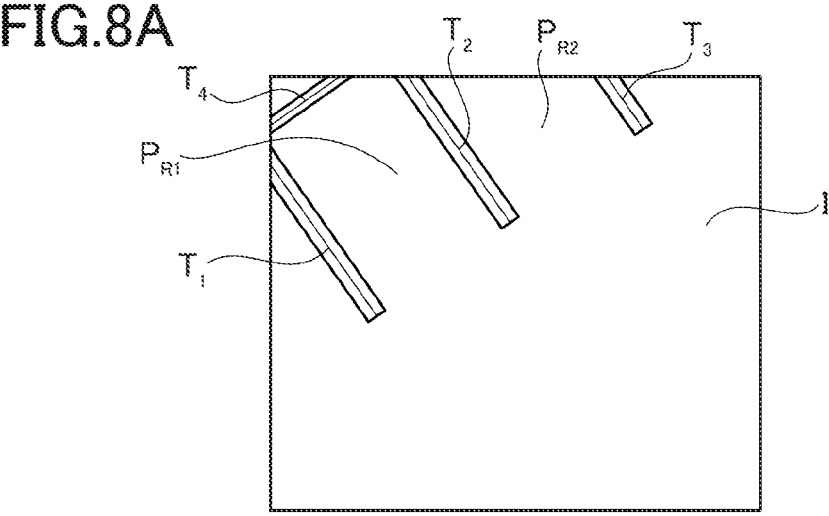
FIG. 8A shows a detected candidate white-line area as one example of how credibility of a parking frame is calculated.
Figure 8B:
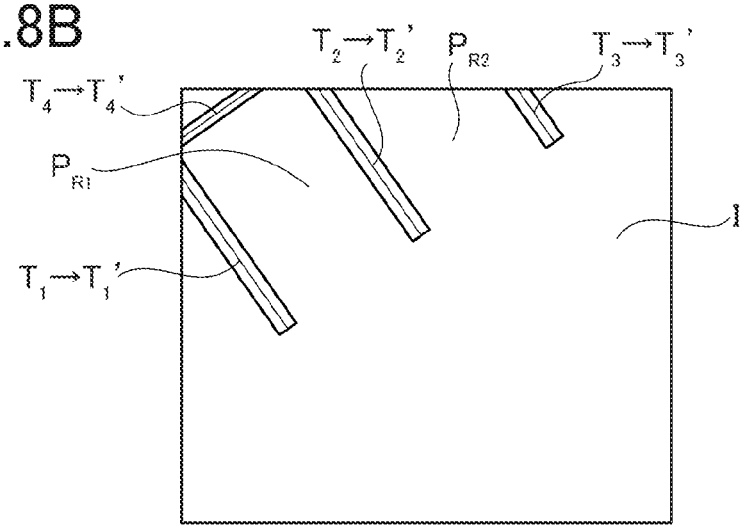
FIG. 8B shows correcting the length of a central line of the detected candidate white-line area on the basis of a parking-frame similitude.
Figure 8C:
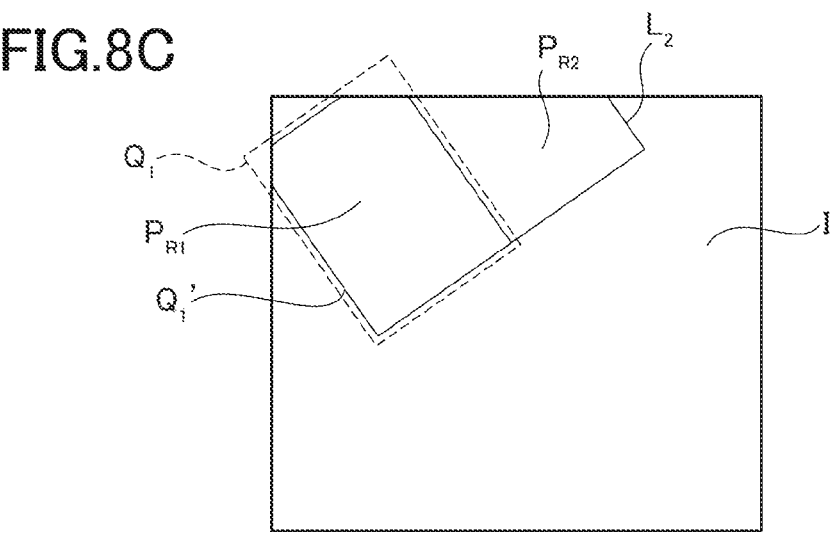
FIG. 8C shows calculating credibility of the detected parking frame.

In FIGS. 8A to 8C three candidate white-line areas of a parking frame $P_{R1}$ are detected by way of example. The lengths of the central lines of the respective candidate white-line areas are $T_1$, $T_2$, $T_4$ in FIG. 8A. These lengths are corrected to lengths $T_1'$, $T_2'$, $T_4'$ on the basis of the flags added to the respective candidate white-line areas in FIG. 8B.

In FIG. 8C the ratio $E(P_{R1})$ of the lengths $T_1'+T_2'+T_4'$ to the length $Q_1'$ of a portion of the perimeter $Q_1$ of the detected parking frame $P_{R1}$ displayed in the image I is calculated. The credibility U of the parking frame $P_{R1}$ is calculated according to the calculated ratio $E(P_{R1})$. The credibility U of a parking frame $P_{R2}$ is calculated in the same manner.

When a number of flags are set for the same candidate white-line area concurrently, the certain ratio is increased to further shorten the length of the central line of this candidate white-line area. This reflects a higher possibility that the candidate white-line area in question is noise.

The credibility U is classified into four levels from least credible credibility $U_1$ to most credible credibility $U_4$, for example, and used for controlling the vehicle later.

Effects of Calculating Credibility of Parking-Frame

Specific scenes for which the calculation of the credibility $U_i$ of the parking frame is expected to bring effects are described with reference to FIG. 9.

FIG. 9 shows a list of specific scenes for which the symmetry, brightness difference, and horizontal difference can exert effects. Note that "use of sonar" in the rightmost column will be described in a second example.

First, a description is made on the scene where symmetry evaluation is effective. By evaluating the symmetry, it is possible to recognize a large difference in the brightness distributions of the right and left sides of the white line. For example, if there is a solid object vertically standing on the road surface such as another vehicle's wheel or shrubbery, symmetry of brightness distribution may not be maintained so that a symmetry evaluation value will be possibly low.

Further, if there is a non-vertical solid object such as a vehicle body's design or wall surface, symmetry of brightness distribution may not be maintained so that a symmetry evaluation value will be possibly low.

Further, if there is a curb or unevenness on the road surface or a rainwater drainage, symmetry of brightness distribution may not be maintained so that a symmetry evaluation value will be possibly low.

Further, if there is a shadow of a vehicle or an electric wire on the road surface, symmetry of brightness distribution may not be maintained so that a symmetry evaluation value will be possibly low.

With a low symmetry evaluation value obtained, there is a possibility to detect a parking frame erroneously. Therefore, even if a candidate white-line area is detected, the credibility of this area is set low.

Next, the effects of brightness difference are described. By evaluating brightness difference, it is possible to recognize an area having small brightness or low contrast on the right or left side of a white line. For example, a solid object vertically standing on the road surface including another vehicle's wheel or shrubbery may lower brightness difference. An evaluation value of the brightness difference may be also lowered.

Further, a non-vertical solid object such as another vehicle's body design or wall surface may lower brightness difference. An evaluation value of the brightness difference may be also lowered.

Further, a curb or unevenness on the road surface or a rainwater drainage may lower brightness difference depending on a situation. An evaluation value of the brightness difference may be also lowered.

Further, in an adverse weather condition raindrops may attach to a lens, for example, and presence of the raindrops may lower brightness difference. An evaluation value of the brightness difference may be also lowered.

Further, a shadow of a vehicle or an electric wire on the road surface may lower a brightness difference. An evaluation value of the brightness difference may be also lowered.

Thus, a low evaluation value of the brightness difference may cause an erroneous detection of a parking frame. In view of this, even if a candidate white-line area is detected, the credibility of the area is set low.

Next, the scenes where the horizontal brightness difference brings effects are described. By evaluating horizontal brightness difference, it is possible to recognize an area having a large brightness difference or largely different lightness between the right and left sides of the white line. For example, a solid object vertically standing on the road surface such as another vehicle's wheel or shrubbery may increase a horizontal difference in the brightness depending on a situation. An evaluation value of the horizontal difference may be increased.

Further, a non-vertical solid object such as another vehicle's body design or wall surface may increase a horizontal difference in the brightness depending on a situation. An evaluation value of the horizontal difference may be also heightened.

Further, a curb or unevenness on the road surface or a rainwater drainage may increase a horizontal difference depending on a situation. An evaluation value of the horizontal difference may be also heightened.

Further, in an adverse weather condition reflection by a road surface or raindrops attached to a lens, for example, may increase a horizontal difference. An evaluation value of the horizontal difference may be also heightened.

Thus, with a high evaluation value of the horizontal difference of brightness obtained, a parking frame may be erroneously detected so that the credibility of a detected candidate white-line area is set low.

Usage of Result of Detected Parking Frame

Presence of a parking frame around the vehicle 1 and the credibility U representing how much the parking frame is credible are determined on the basis of a result of a detected parking frame. The vehicle behavior controller 80 (FIG. 2) executes the following vehicle control according to the credibility U of the detected parking frame.

Upon detection of the parking frame in the image I, when the accelerator position detector 70 (FIG. 2) detects an accelerator position of a predetermined value or more, the vehicle behavior controller 80 (FIG. 2) determines that a driver erroneously steps on an accelerator pedal instead of a brake pedal and controls the engine output to decrease and prevents the engine output from reaching an amount corresponding to an actual accelerator position. Then, the information output 90 (FIG. 2) displays a reduction in the engine output because of the detection of the parking frame to notify a driver.

By such a vehicle control, it is possible to prevent a vehicle from abruptly running in a parking space by erroneously stepping on a wrong pedal.

Note that the details of a vehicle control to execute are changeable on the basis of credibility U of a detected parking frame.

By the above parking-frame detecting process, a number of parking frames are detected in the image I. The detected parking frames are provided the credibility $U_i$ (i=1 to 4). Note that the relation, $U_1<U_2<U_3<U_4$ holds true and it is assumed that the larger the value of i, the higher the credibility.

Among the parking frames present in the image, the credibility $U_i$ of a parking frame having the lowest credibility is set as the credibility of the parking frame in the image I.

When the credibility of the parking frame in the image I is determined to be $U_1$, no detection of a parking frame is determined and neither control nor display is executed. Further, when the credibility of the parking frame in the image I is determined as $U_2$, the information output 90 displays, on the screen, information to warn a driver not to mistake accelerating operation for braking operation in the parking space or outputs it through an audio guide for calling a driver's attention. Further, when the credibility of the parking frame in the image I is determined as $U_3$, the engine output is controlled to decrease as described above, and a control amount (reduced amount of the engine output) is set small. When the credibility of the parking frame in the image I is determined as $U_4$, the engine output is controlled to decrease, and a control amount (reduced amount of the engine output) is set large.

As described above, in accordance with the credibility $U_i$ of a detected parking frame, the vehicle can be properly controlled. Further, if there is a possibility that a parking frame is erroneously detected, the vehicle can be properly controlled according to a state of the detected parking frame by reducing an amount of control over the vehicle.

Operation of First Example

Figure 10:
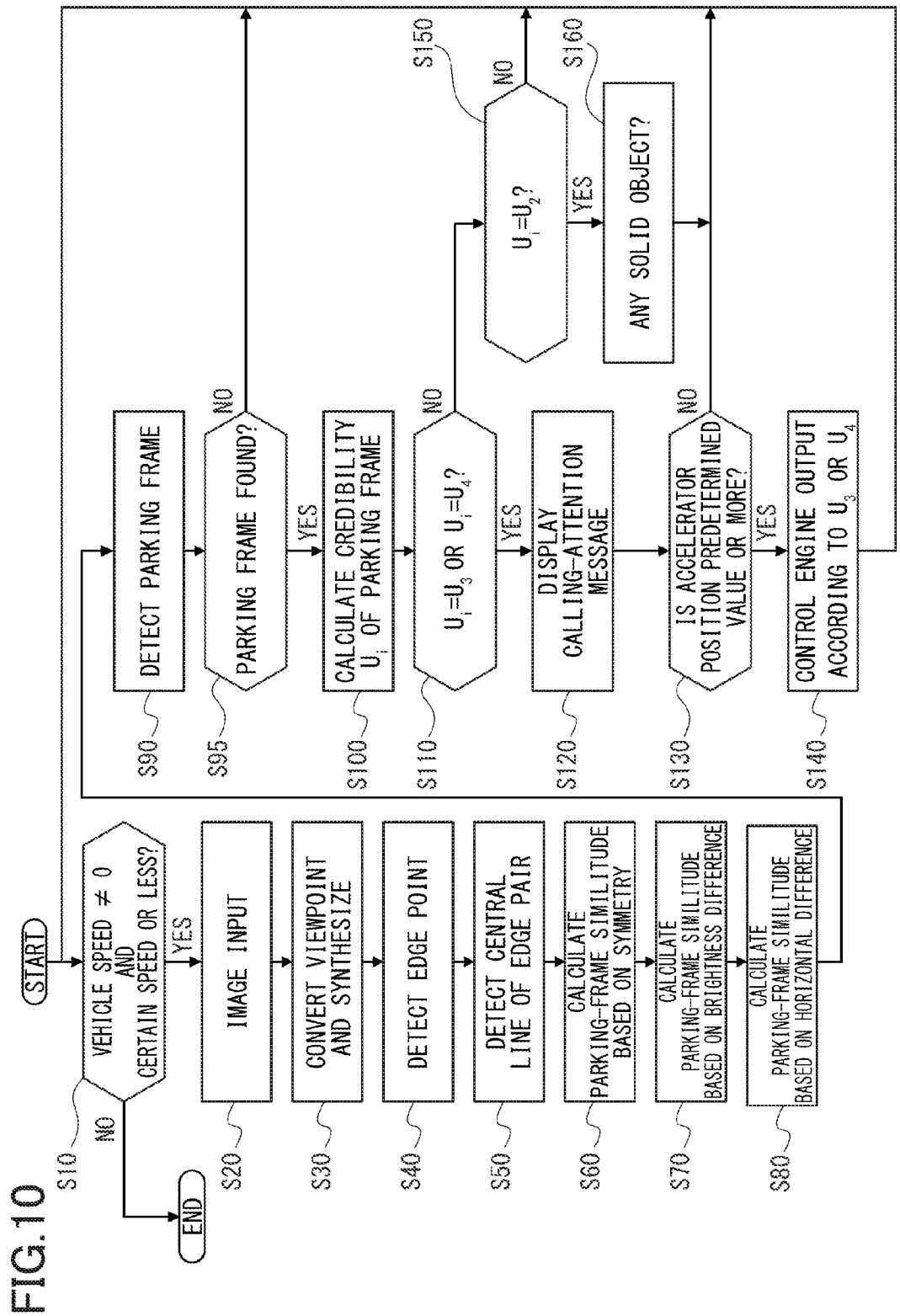
FIG. 10 is a flowchart for the processing of the first example according to one embodiment of the present invention.

Next, a series of operation of the on-vehicle image processor 5 of the first example is described referring to the flowchart in FIG. 10.

(Step S10) In accordance with an output of a speed sensor not shown in FIG. 2, the speed of the vehicle 1 is detected. Then, a determination is made on whether or not the detected speed is not zero and equal to or smaller than a predetermined speed. When the detected speed is not zero and equal to or smaller than a predetermined speed, the operation proceeds to step S20. When the detected speed is zero or equal to or smaller than a predetermined speed, the operation in FIG. 10 is completed.

(Step S20) The imager 10 images the periphery of the vehicle 1.

(Step S30) The image converter and synthesizer 20 converts the images captured by the imager 10 to overhead views and synthesizes them into a single image I as shown in FIG. 4A.

(Step S40) The edge pair detector 32 detects edge points as +edge and −edge in the image I.

(Step S50) Further, the central-line detector 34 detects the central line M formed of the midpoints of +edges and −edges.

(Step S60) The symmetry evaluator 43 calculates a parking-frame similitude based on symmetry of brightness distribution of a detected candidate white-line area. Detailed operation has been described above, therefore, it is omitted here.

(Step S70) The brightness difference evaluator 44 calculates a parking-frame similitude on the basis of a brightness difference in the detected candidate white-line area. Detailed operation has been described above, therefore, it is omitted here.

(Step S80) The horizontal difference evaluator 45 calculates a parking-frame similitude on the basis of a horizontal brightness difference in the detected candidate white-line areas. Detailed operation has been described above, therefore, it is omitted here.

(Step S90) The parking frame detector 60 detects a parking frame in the image I. Detailed operation has been described above, therefore, it is omitted here.

(Step S95) A determination is made on whether or not a parking frame is found in step S90. When it is found, the operation proceeds to step S100, and when it is not found, the operation returns to step S10.

(Step S100) The parking frame detector 60 sets a lowest credibility of the credibilities of all detected parking frames in the image I as the credibility $U_i$ of a parking frame in the image I.

(Step S110) A determination is made on whether the credibility $U_i$ is equal to $U_4$ or $U_3$. When $U_i$ is either $U_4$ or $U_3$, the operation proceeds to step S120, and when U is not $U_4$ or $U_3$, the operation proceeds to step S150.

(Step S120) For calling a driver's attention, the information output 90 displays, on the screen, information to warn the driver not to mistake accelerating operation for braking operation in the parking space or outputs it through an audio guide.

(Step S130) The accelerator position detector 70 determines whether or not an accelerator position is a predetermined or more. With the accelerator position of a predetermined value or more obtained, the operation proceeds to step S140. With the accelerator position not reaching a predetermined value, the operation returns to step S10.

(Step S140) The vehicle behavior controller 80 controls the engine output to decrease in accordance with the credibility $U_4$ or $U_3$, as described above. Then, the operation returns to step S10.

(Step S150) A determination is made on whether or not the calculated credibilities $U_i$ and $U_2$ are equal to each other. When $U_i$ is equal to $U_2$, the operation proceeds to step S160 and when $U_i$ is not equal to $U_2$, the operation returns to step S10.

(Step S160) For calling a driver's attention, the information output 90 displays, on the screen, information to warn the driver not to mistake accelerating operation for braking operation in the parking space or outputs it through an audio guide. The operation then returns to step S10.

As described above, in the on-vehicle image processor 5 according to one embodiment of the present invention, the imager 10 mounted on the vehicle 1 captures the image I including at least the road surface around the vehicle 1. The candidate white-line area detector 30 scans the captured image I from left to right (certain direction) to detect a first pixel position and a second pixel position and detects, as a candidate white-line area, an area surrounded by both end points of a linear element of first pixels and both end points of a linear element of second pixels. The first pixel position is a position of a first pixel at which a brightness value of the image I changes to be brighter and exceeds the brightness-difference threshold $I_{th}$ (predetermined value). The second pixel position is a position of a second pixel in a certain distance W from the first pixel and at which a brightness value of the image I changes to be darker and exceeds the brightness difference threshold $I_{th}$ (predetermined value). The parking-frame similitude calculator 40 calculates a brightness distribution around a boundary point between the road surface and the detected candidate white-line area and determines a parking-frame similitude to be low when the brightness distribution satisfies a certain condition, the similitude being a degree in which the candidate white-line area forms a parking frame. The parking frame detector 60 detects a parking frame on the basis of an expected size of a parking frame in the image I. Then, when the parking-frame similitude of the candidate white-line area is low, the credibility U of the detected parking frame is set low. Thereby, it is able to prevent an erroneous detection of a parking frame because of noise on the road surface and stably detect the position of a parking frame drawn on the road surface.

In the on-vehicle image processor 5 according to one embodiment of the present invention, when moving the midpoints of the first and second pixels as the +edges and −edges along the central line M connecting the midpoints in the candidate white-line area, the brightness difference evaluator 44 calculates a difference in brightness between the midpoints and the third pixel $P_{11}$ and a difference in brightness between the midpoints and the fourth pixel $P_{21}$, to find a midpoint at which at least either of the brightness differences becomes smaller than a predetermined value. The third pixel is separated from the midpoints towards the first pixel in the distance $W_2$ (first predetermined distance) and the fourth pixel is separated from the midpoints towards the second pixel in the distance $W_2$ (first predetermined distance). Then, the brightness difference evaluator 44 evaluates whether or not the number of midpoints with a smaller brightness difference than the predetermined value accounts for the total number of the midpoints of the candidate white-line area at a larger ratio than a predetermined ratio, (brightness-difference evaluation index).

Moreover, when the midpoints are moved along the central line M, the horizontal difference evaluator 45 calculates a brightness difference between the third pixel $P_{11}$ and the fourth pixel $P_{21}$ to find the number of pairs of the third and fourth pixels $P_{11}$, $P_{21}$ different in brightness by a predetermined value or more and evaluate whether or not the number of the pairs of the third and fourth pixels $P_{11}$, $P_{21}$ accounts for the total number of the midpoints of the candidate white-line area at a larger ratio than a predetermined ratio (horizontal brightness difference evaluation index).

Further, the symmetry evaluator 43 sets the fifth pixel separated from the midpoints toward the first pixel by the width $W_1$ (second predetermined distance) and the sixth pixel separated from the midpoints toward the second pixel by the width $W_1$ (second predetermined distance) to evaluate whether or not the difference in brightness distribution between an inside of an area drawn by a line connecting the midpoints and the fifth pixel and an inside of an area drawn by a line connecting the midpoints and the sixth pixel is larger than a predetermined value, when the midpoints are moved along the central line (symmetry evaluation index).

When at least one of the three evaluation indexes is satisfied, the parking-frame similitude of the candidate white-line area is lowered. Therefore, it is able to calculate the parking-frame similitude in accordance with a change in the brightness distribution of the parking frame affected by noise on the road surface and thereby determine the credibility of a detected parking frame.

Further, in the on-vehicle image processor 5 according to one embodiment of the present invention, the parking-frame similitude calculator 40 evaluates the symmetry, brightness difference, and horizontal difference of the candidate white-line area detected by the candidate white-line area detector 30 on the basis of the brightness distribution of the periphery of the candidate white-line area. When two or three of the symmetry, brightness difference, and horizontal difference are concurrently satisfied, a lower parking-frame similitude is set for the candidate white-line area to provide the credibility $U_i$. This makes it possible to further certainly determine the parking-frame similitude of the detected candidate white-line area.

Further, the on-vehicle image processor 5 according to one embodiment of the present invention includes the image converter and synthesizer (image converter) 20 to convert the images captured by the imager 10 into overhead images (image I) of the vehicle 1 seen from directly above. The candidate white-line area detector 30 detects a candidate white-line area in the converted image by the image converter 20. The parking frame drawn on the road surface is converted to a rectangular area. Thereby, it is made possible to easily detect a parking frame in the image I according to the feature of a shape of the parking frame.

Second Example

Next, a second example is described. In comparison with the structure of the first example, the second example additionally includes a solid object detector which detects a solid object around the vehicle to calculate the parking-frame similitude of a candidate white-line area according to a detected solid object around the vehicle.

Figure 11:
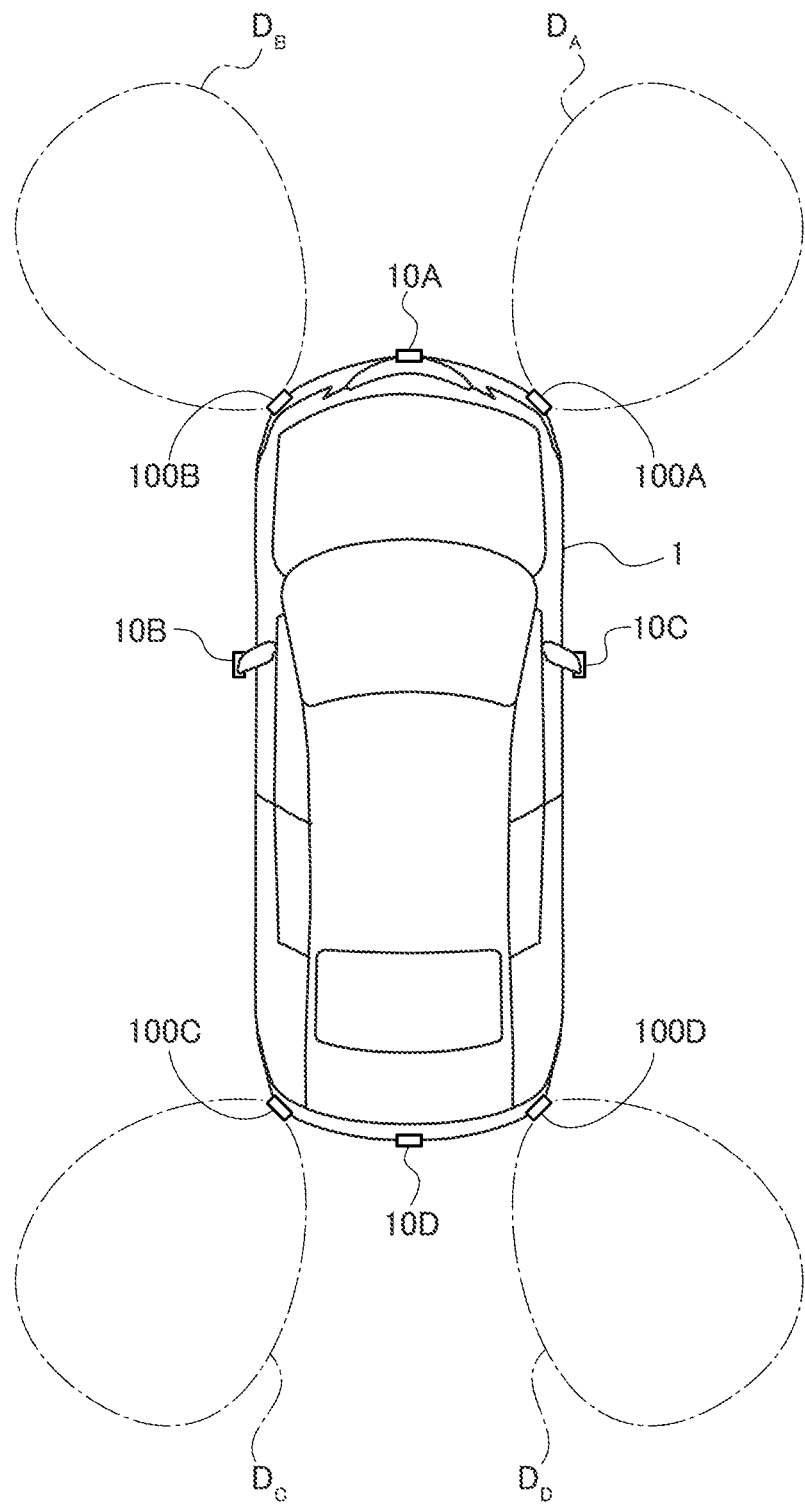
FIG. 11 shows a vehicle on which a second example of an on-vehicle image processor according to one embodiment of the present invention is mounted.
Figure 12:
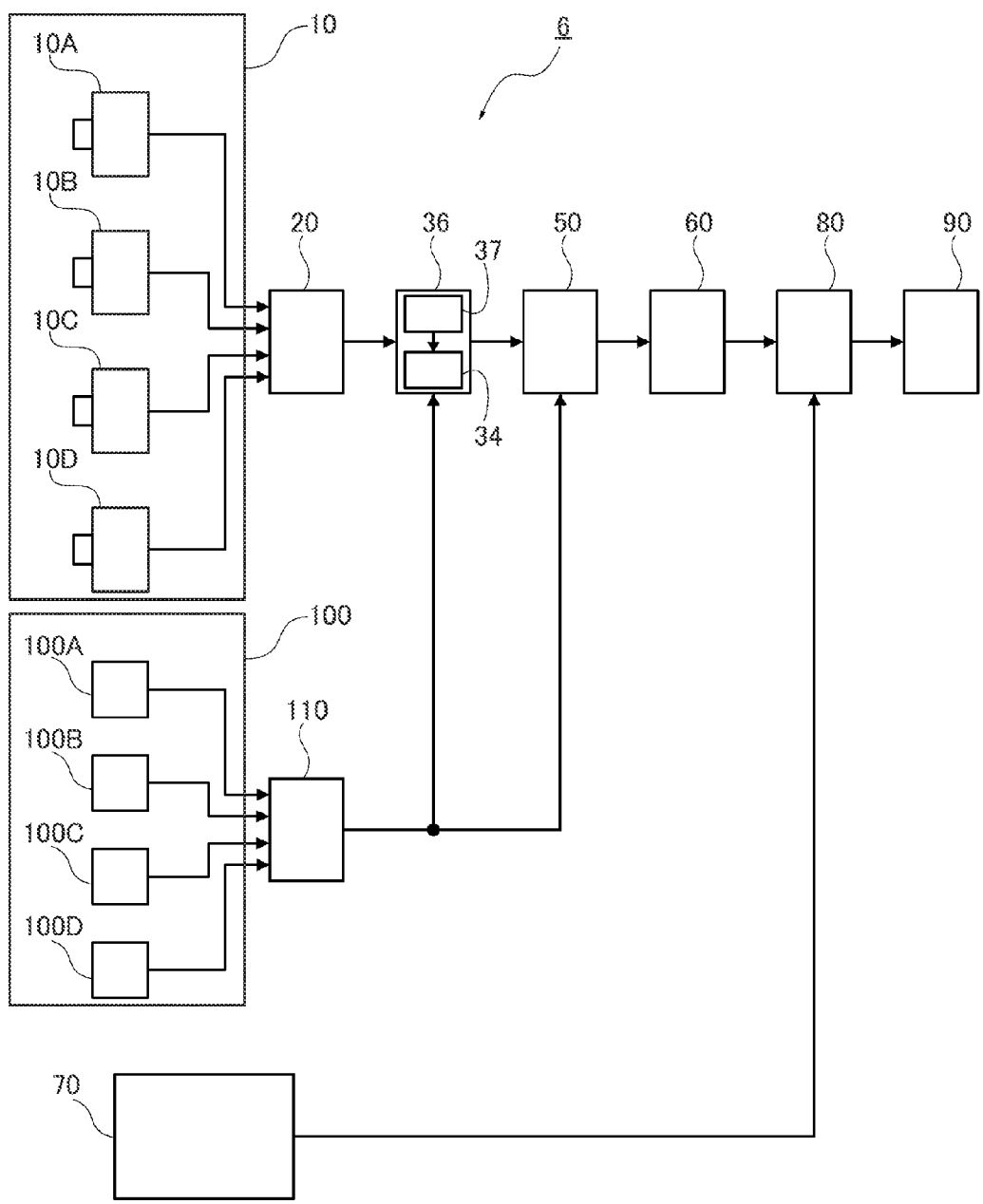
FIG. 12 is a block diagram of the overall structure of the second example according to one embodiment of the present invention.
Figure 13:
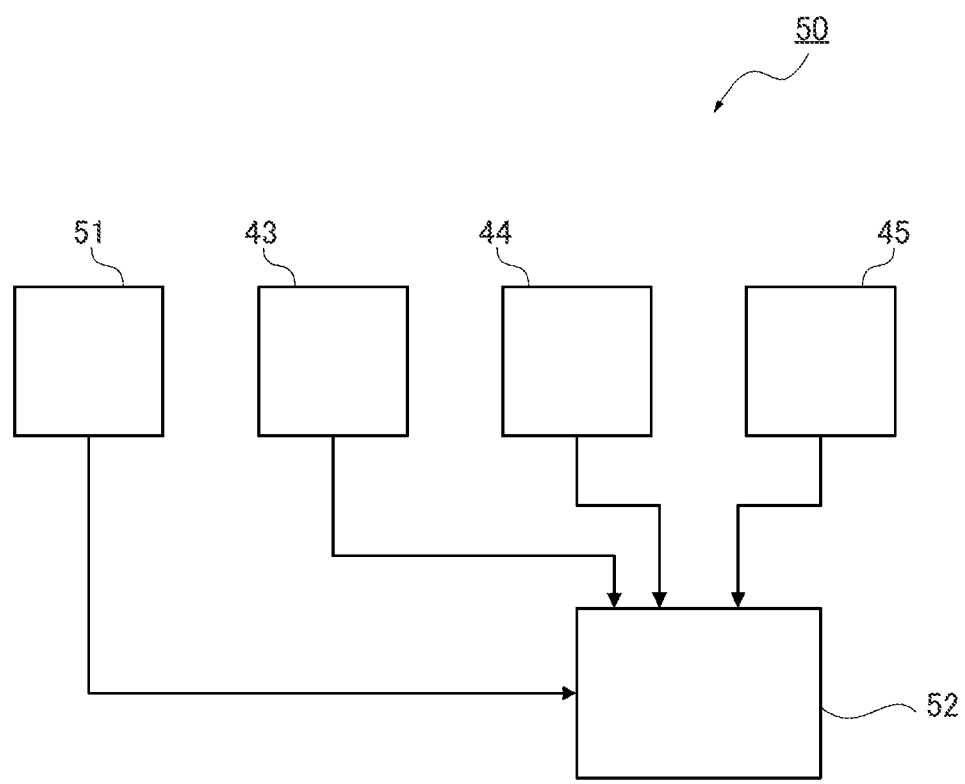
FIG. 13 shows a detailed structure of the second example of a parking-frame similitude calculator according to one embodiment of the present invention.

First, the structure of the second example is described, referring to FIG. 11 to FIG. 13. An on-vehicle image processor 6 in the second example is mounted on the vehicle 1 and includes distance sensors 100A, 100B, 100C, 100D placed at the four corners of the vehicle 1 to determine presence or absence of a solid object in a certain measuring area in addition to a front camera 10A, a left camera 10B, a right camera 10C, and a rear camera 10D to capture an image in four different directions from the vehicle 1, as shown in FIG. 11.

The distance sensor 100A is mounted on the right front of the vehicle 1 to observe a measuring area $D_A$. The distance sensor 100B is mounted on the left front of the vehicle 1 to observe a measuring area $D_B$. The distance sensor 100C is mounted on the left rear of the vehicle 1 to observe a measuring area $D_C$. The distance sensor 100D is mounted on the right rear of the vehicle 1 to observe a measuring area $D_D$.

FIG. 12 is a block diagram of the overall structure of the on-vehicle image processor 6. In addition to the elements of the first example, the on-vehicle image processor 6 further includes the solid object detector 100 that measures a distance to a solid object around the vehicle 1 and a solid-object information obtainer 110 which summarizes solid-object information detected by the solid object detector 100.

Further, in the second example a candidate white-line area detector 36 is used in place of the candidate white-line area detector 30 in the first example and a parking-frame similitude calculator 50 is used in place of the parking-frame similitude calculator 40 due to a change in the inner structure.

The solid object detector 100 includes the distance sensors such as an ultrasonic sensor or millimeter-wave radar to detect presence or absence of a solid object in the measuring areas $D_A$ to $D_D$.

The candidate white-line area detector 36 includes an edge pair detector 37 which detects pairs of +edges and −edges in a certain direction and a central-line detector 34 which detects a central line formed of the midpoints of a line connecting the edge pairs from each candidate white-line area.

The parking-frame similitude calculator 50 includes a solid-object information evaluator 51 which evaluates information on presence of a solid object measured by the solid object detector 100 and a parking-frame similitude manager 52 which stores and manages evaluation values as shown in FIG. 13, in addition to the parking-frame similitude calculator 40 including the symmetry evaluator 43, brightness difference evaluator 44, and horizontal difference evaluator 45 in FIG. 3.

In the following a difference in the operation of the second example from that of the first example will be mainly described. Description of an overlapping portion with the first example will be omitted.

Usage of Solid-Object Information

After the symmetry of brightness distribution, the magnitude of brightness difference and horizontal brightness difference in the areas near the candidate white-line area are evaluated, the parking-frame similitude is corrected on the basis of solid-object information around the vehicle 1 obtained by the solid object detector 100.

When a solid object is present in the imaging area of the imager 10, the brightness distribution of the solid object not a road surface is imaged at the position of the road surface. Accordingly, the brightness distribution obtained in the image I is different from that of the candidate white-line area or the road surface.

For example, with presence of another vehicle in the vicinity of the vehicle 1, an image of another vehicle or shadow of this vehicle is captured in the position where a parking frame should be imaged. Thus, an object other than a white line appears in a position where the candidate white-line area should appear or the white line is shadowed by another vehicle, resulting in lowering a brightness difference between the road surface and the white line.

According to the first example the parking-frame similitude is calculated according to the three evaluation indexes of symmetry, brightness difference, and horizontal difference, and the credibility of a detected parking frame is set according to the parking-frame similitude.

Therefore, with presence of the solid object near the vehicle 1, the parking-frame similitude is decreased, leading to lowering the credibility of a detected parking frame or making it impossible to detect a parking frame.

In the second example, when a solid object is present in the vicinity of the vehicle 1, the detection of the candidate white-line area and the evaluation of the parking-frame similitude are performed in different manners than those in the first example.

That is, a solid object near the vehicle 1 such as a pole standing on the road surface may be erroneously recognized as a white line. Therefore, with a solid object found, the threshold for detecting the candidate white-line area is set to a value which makes it difficult to detect the candidate white-line area. Herein, the threshold for detecting the candidate white-line area is the brightness difference threshold $I_{th}$ for detecting the +edge and −edge and the interval w between the +edge and −edge.

Alternatively, it can be made difficult to detect the parking frame when the solid object is present near the vehicle 1. In this case the width, length, and parallelism representing the features of the parking frame can be set to values which make it difficult to detect a parking frame.

Meanwhile, a parking frame may be correctly detected even with a solid object present near the vehicle 1. However, it is assumed that the contrast of a parking frame which should be certainly detected may be decreased by the shadow of a solid object, lowering a parking-frame similitude.

Accordingly, when such a solid object is detected, it is effective to ignore the flags set based on the above symmetry, brightness difference, and horizontal difference. In this case, even with the flags set, the parking-frame similitude is not lowered.

Effects of Calculating Credibility of Parking Frame

The examples of scenes where the calculation of the credibility $U_t$ of the parking frame can be expected to bring effects are described, referring to FIG. 9.

Here, the "use of sonar" on the rightmost column in FIG. 9 is described.

Upon detecting a solid object, that is, an object standing on the road surface, the threshold for detecting the candidate white-line area can be set to a value which makes it difficult to detect the candidate white-line area. Thereby, it is able to prevent a solid object vertically standing on the road surface such as a pole, another vehicle's wheel, or shrubbery from being erroneously recognized as a parking frame.

Likewise, as for a non-vertical solid object such as vehicle's body design, wall surface, the threshold for detecting the candidate white-line area is set to a value which makes it difficult to detect a parking frame. Thereby, it is able to prevent these objects from being erroneously recognized as a candidate white-line area.

Further, even when it is difficult to detect the candidate white-line area by the shadow of another vehicle as a solid object and a parking-frame similitude calculated from the candidate white-line area is low, the parking-frame similitude is not lowered purposefully. Thereby, even the parking frame covered with the shadow can be detected.

Operation of Second Example

Next, a series of operation of the on-vehicle image processor 6 is described, referring to a flowchart in FIG. 14.

(Step S200) The speed of the vehicle 1 is detected from an output of a speed sensor not shown in FIG. 12. A determination is made on whether or not the detected speed is not zero and equal to or less than a predetermined speed. When the speed is determined to be not zero and equal to or less than the predetermined value, the operation proceeds to step S210. When the speed is determined to be zero or not equal to or less than the predetermined value, the operation in FIG. 14 is completed.

(Step S210) The imager 10 captures images of the surroundings of the vehicle 1.

(Step S220) The image converter and synthesizer 20 converts the images captured by the imager 10 to overhead views and synthesizes them into a single image I as shown in FIG. 4A.

(Step S222) A determination is made on whether or not any of the distance sensors 100A, 100B, 100C, 100D of the solid object detector 100 detects a solid object. When any of the distance sensors detects a solid object, the operation proceeds to step S230. When a solid object is not detected, the operation proceeds to step S232.

(Step S230) The edge pair detector 37 detects edge points forming +edge and −edge in the image I. For one of the images $I_1, I_2, I_3, I_4$ captured in the direction in which the solid object is detected, the brightness difference threshold $I_{th}$ for detecting the +edge and −edge and the interval w between the +edge and −edge are set to values which make makes it difficult to detect the candidate white-line area.

(Step S232) The edge pair detector 37 detects edge points as +edge and −edge in the image I. The brightness difference threshold $I_{th}$ for detecting the +edge and −edge and the interval w between the +edge and −edge are set to predetermined values instead of values which make it difficult to detect the candidate white-line area.

(Step S240) Further, the central-line detector 34 detects the central line M formed of the midpoints of +edges and −edges.

(Step S250) The symmetry evaluator 43 calculates a parking-frame similitude based on the symmetry of brightness distribution of a detected candidate white-line area. Detailed operation has been described above, therefore, it is omitted here.

(Step S260) The brightness difference evaluator 44 calculates a parking-frame similitude on the basis of a brightness difference in the detected candidate white-line area. Detailed operation has been described above, therefore, it is omitted here.

(Step S270) The horizontal difference evaluator 45 calculates a parking-frame similitude on the basis of a horizontal brightness difference in the detected candidate white-line area. Detailed operation has been described above, therefore, it is omitted here.

(Step S290) The parking frame detector 60 detects a parking frame in the image I. Detailed operation has been described above, therefore, it is omitted here.

(Step S300) A determination is made on whether or not any of the distance sensors 100A, 100B, 100C, 100D of the solid object detector 100 detects a solid object. When any of the distance sensors detects a solid object, the operation proceeds to step S310. When a solid object is not detected, the operation proceeds to step S320.

(Step S310) The parking frame detector 60 sets a lowest credibility of the credibilities of all detected parking frames in the image I as the credibility $U_i$ of a parking frame in the image I. Note that even if the flags based on symmetry, brightness difference, and horizontal brightness are set, the flags should not be considered for one of the images $I_1, I_2, I_3, I_4$ captured in the direction in which the solid object is detected, so as not to decrease the parking-frame similitude of the candidate white-line area.

(Step S320) The parking frame detector 60 sets a lowest credibility of the credibilities of all detected parking frames in the image I as the credibility $U_i$ of a parking frame in the image I. The parking-frame similitude of the candidate white-line area is decreased in accordance with the flags set based on symmetry, brightness difference, and horizontal brightness, if any.

(Step S330) A determination is made on whether or not the calculated credibility $U_i$ is equal to $U_4$ or $U_3$. When $U_i$ is equal to $U_4$ or $U_3$, the operation proceeds to step S340 and when $U_i$ is not equal to $U_4$ and $U_3$, the operation proceeds to step S350.

(Step S340) For calling a driver's attention, the information output 90 displays, on the screen, information to warn the driver not to mistake accelerating operation for braking operation in the parking space or outputs it through an audio guide.

(Step S370) The accelerator position detector 70 determines whether or not an accelerator position is a predetermined value or more. With the accelerator position of a predetermined value or more obtained, the operation proceeds to step S380. With the accelerator position not reaching a predetermined value, the operation returns to step S200.

(Step S380) The vehicle behavior controller 80 controls the engine output to decrease in accordance with the credibility $U_4$ or $U_3$, as described above. Then, the operation returns to step S200.

(Step S350) A determination is made on whether the calculated credibility $U_i$ is equal to $U_2$. When $U_i$ is equal to $U_2$, the operation proceeds to step S360 and when $U_i$ is not equal to $U_2$, the operation returns to step S200.

(Step S360) For calling a driver's attention, the information output 90 displays, on the screen, information to warn the driver not to mistake accelerating operation for braking operation in the parking space or outputs it through an audio guide. The operation returns to step S200.

As described above, the on-vehicle image processor 6 according to one embodiment of the present invention is mounted on the vehicle 1 and comprises the solid object detector 100 which detects presence or absence of a solid object in the imaging area of the imager 10. When the solid object detector 100 detects a solid object, the brightness difference threshold $I_{th}$ and the interval w are set to difficult values which make it difficult for the candidate white-line area detector 36 to detect a candidate white-line area in an area of the image I corresponding to the area in which the solid object is detected. Further, even if the candidate white-line area satisfies the certain condition, the parking-frame similitude thereof is not changed. Thereby, it is made possible to certainly detect the position of the parking frame drawn on the road surface even with presence of a solid object in the vicinity of the vehicle 1.

Although the present invention has been described in terms of exemplary embodiments referring to the accompanying drawings, it is not limited thereto. It should be appreciated that variations or modifications may be made in the embodiments described by persons skilled in the art without departing from the scope of the present invention as defined by the following claims.

CROSS-REFERENCE TO RELATED APPLICATION

The present application is based on and claims priority from Japanese Patent Application No. 2012-258697, filed on Nov. 27, 2012, the disclosure of which is hereby incorporated by reference in its entirety.

REFERENCE SIGNS LIST 5 on-vehicle image processor
10 imager
10A front camera
10B left camera
10C right camera
10D rear camera
20 image converter and synthesizer (image converter)
30 candidate white-line area detector
32 edge pair detector
34 central line detector
40 parking-frame similitude calculator
60 parking frame detector
70 accelerator position detector
80 vehicle behavior controller
90 information output

The invention claimed is:

1. An on-vehicle image processor comprising:
an imager mounted on a vehicle, which observes surroundings of the vehicle and captures an image including at least a road surface;
a candidate white-line area detector which
detects positions of a first pixel and a second pixel while scanning the image captured by the imager in a certain direction, the first pixel of which a brightness value changes to be brighter and exceeds a predetermined value, the second pixel being located within a certain distance from the first pixel, of which a brightness value changes to be darker and exceeds a predetermined value, and
detects, as a candidate white-line area forming a parking frame, an area surrounded by both end points of a linear element of the first pixels and both end points of a linear element of the second pixels;
a parking-frame similitude calculator which calculates a parking-frame similitude according to a brightness distribution of surroundings of the first pixels of the candidate white-line area and a brightness distribution of surroundings of the second pixels, the parking-frame similitude being a similitude when each of the candidate white-line areas is assumed to form a parking frame; and
a parking frame detector which detects a parking frame according to the position of the candidate white-line area, the parking-frame similitude, and an expected size of a parking frame in the image, wherein
the parking-frame similitude calculator decreases the parking-frame similitude of the candidate white-line area when the brightness distributions of the surroundings of the first pixels and the second pixels of the candidate white-line area satisfy a certain condition.

2. The on-vehicle image processor according to claim 1, further comprising
a solid object detector mounted on the vehicle, which detects presence or absence of a solid object in an imaging area of the imager, wherein
when the solid object detector detects a solid object, the predetermined value and the certain distance is set to values which make it difficult for the candidate white-line area detector to detect the candidate white-line area in an area of the image corresponding to the area in which the solid object is detected; and
even when the candidate white-line area satisfies the certain condition, the parking-frame similitude of the candidate white-line area is not changed.

3. The on-vehicle image processor according to claim 1, wherein
the certain condition is at least one of the following conditions relative to a central line connecting midpoints of the first and second pixels in the candidate white-line area:
when the midpoints are moved along the central line, a number of midpoints at which at least either of a difference in brightness between the midpoints and a third pixel and a difference in brightness between the midpoints and a fourth pixel becomes smaller than a predetermined value accounts for a total number of the midpoints of the candidate white-line area at a larger ratio than a predetermined ratio, the third pixel separated from the midpoints towards the first pixels in a first predetermined distance, the fourth pixel separated from the midpoints towards the second pixels in the first predetermined distance;
when the midpoints are moved along the central line, a number of pairs of third and fourth pixels of which a difference in brightness is different by a predetermined value or more accounts for the total number of the midpoints of the candidate white-line area at a larger ratio than a predetermined ratio; and
a fifth pixel and a six pixel are set, the fifth pixel separated from the midpoints toward the first pixel in a second predetermined distance, the sixth pixel separated from the midpoints toward the first pixel in a second predetermined distance, and when the midpoints are moved along the central line, a difference in brightness distributions between an inside of an area drawn by a line connecting the midpoints and the fifth pixel and an inside of an area drawn by a line connecting the midpoints and a sixth pixel is larger than a predetermined value.

4. The on-vehicle image processor according to claim 3, wherein
the parking-frame similitude calculator sets the parking-frame similitude of the candidate white-line area to a lower value when a plurality of conditions among the certain conditions are satisfied than when only one of the certain conditions is satisfied.

5. The on-vehicle image processor according to claim 1, further comprising
an image converter which converts the image captured by the imager to an overhead image of the vehicle viewed from directly above, wherein
the candidate white-line area detector detects the candidate white-line area in the image converted by the image converter.

* * * * *